United States Patent
Gutierrez, Jr. et al.

(10) Patent No.: US 9,945,253 B2
(45) Date of Patent: Apr. 17, 2018

(54) COLLECTING / REMOVING BYPRODUCTS OF LASER ABLATION

(71) Applicant: Rohr, Inc., Chula Vista, CA (US)

(72) Inventors: Manuel B. Gutierrez, Jr., Fontana, CA (US); Charles Novak, Moreno Valley, CA (US)

(73) Assignee: Rohr, Inc., Chula Vista, CA (US)

( * ) Notice: Subject to any disclaimer, the term of this patent is extended or adjusted under 35 U.S.C. 154(b) by 367 days.

(21) Appl. No.: 14/609,154

(22) Filed: Jan. 29, 2015

(65) Prior Publication Data
US 2016/0221121 A1 Aug. 4, 2016

(51) Int. Cl.
| | |
|---|---|
| B23K 26/12 | (2014.01) |
| B23K 26/14 | (2014.01) |
| B23K 26/38 | (2014.01) |
| F01D 25/24 | (2006.01) |
| B23K 26/364 | (2014.01) |
| B23K 26/142 | (2014.01) |
| B23K 26/382 | (2014.01) |
| B23K 103/16 | (2006.01) |

(52) U.S. Cl.
CPC ............ *F01D 25/24* (2013.01); *B23K 26/123* (2013.01); *B23K 26/128* (2013.01); *B23K 26/142* (2015.10); *B23K 26/1438* (2015.10); *B23K 26/1476* (2013.01); *B23K 26/364* (2015.10); *B23K 26/382* (2015.10); *B23K 2203/16* (2013.01)

(58) Field of Classification Search
CPC .. B23K 26/123; B23K 26/128; B23K 26/142; B23K 26/1438; B23K 26/1476; B23K 26/34; B23K 26/38; B23K 26/382
See application file for complete search history.

(56) References Cited

U.S. PATENT DOCUMENTS

| | | | |
|---|---|---|---|
| 4,315,133 A | 2/1982 | Morgan et al. | |
| 4,801,352 A | 1/1989 | Piwczyk | |
| 4,942,284 A * | 7/1990 | Etcheparre ........... | B23K 26/123 219/121.84 |
| 5,491,319 A | 2/1996 | Economikos et al. | |
| 5,756,962 A | 5/1998 | James et al. | |
| 5,876,767 A * | 3/1999 | Mattes ................. | B23K 26/123 264/482 |

(Continued)

FOREIGN PATENT DOCUMENTS

| | | |
|---|---|---|
| DE | 29518138 U1 | 4/1996 |
| DE | 10160785 C1 * | 8/2003 |

(Continued)

OTHER PUBLICATIONS

Machine translation of Japan Patent No. 9-29,465, Jan. 2017.*

(Continued)

*Primary Examiner* — Geoffrey S Evans
(74) *Attorney, Agent, or Firm* — O'Shea Getz P.C.

(57) ABSTRACT

A method is provided for operating a laser system. During an embodiment of this method, inert gas is directed against an object within a cavity of a collection device. An aperture is formed in the object by ablating the object with a laser beam that travels within the cavity and to the object. Byproducts of the ablation are removed from the cavity. During another embodiment of the method, inert gas is pooled against an object and a gas curtain is provided proximate a lens. The object is cut using a laser beam which travels from the lens, through the gas curtain and the pooled inert gas, to the object. Fumes and/or particulates produced by the formation are directed away from the laser beam.

20 Claims, 9 Drawing Sheets

(56) References Cited

U.S. PATENT DOCUMENTS

| | | | |
|---|---|---|---|
| 6,531,682 B1 | 3/2003 | Guttler | |
| 6,683,277 B1 | 1/2004 | Millard et al. | |
| 8,328,410 B1 | 12/2012 | Retamal | |
| 2003/0042657 A1 | 3/2003 | Dublineau et al. | |
| 2004/0226927 A1* | 11/2004 | Morikazu | B23K 26/123 219/121.84 |
| 2008/0210675 A1* | 9/2008 | Sasaki | B23K 26/142 219/121.84 |
| 2009/0314753 A1* | 12/2009 | Kosmowski | B23K 26/14 219/121.72 |
| 2013/0075193 A1* | 3/2013 | Vavalle | B29C 70/088 181/284 |

FOREIGN PATENT DOCUMENTS

| | | | |
|---|---|---|---|
| JP | 59-142520 A | * | 8/1984 |
| JP | 5-123886 A | * | 5/1993 |
| JP | 09-029465 A | * | 2/1997 |
| JP | 9-29465 A | * | 2/1997 |
| JP | 2004-160463 A | * | 6/2004 |
| JP | 2006198664 A | | 8/2006 |
| WO | WO-2005/118210 A1 | * | 12/2005 |

OTHER PUBLICATIONS

EP search report for EP16152996.1 dated Jul. 1, 2016.

K. H. Leong et al., "Laser-Based Characterization and Decontamination of Contaminated Facilities", Nov. 21, 1996, downloaded from <http://www.iaea.org/inis/collection/NCLCollectionStore/_Public/28/068/28068319.pdf?origin=publication_detail>.

Parker, "Industrial Nitrogen Gas From Generation to Application", downloaded on Oct. 15, 2014 from <http://www.parker.com/literature/domnick%20hunter%20Industrial%20Division/174004707_EN_INDUSTRIAL_NITROGEN_GAS_MSB.PDF>.

Topac.com, "MAP Mix 9000 Proportional Gas Mixer", downloaded on Oct. 15, 2014 from <http://www.topac.com/gasmix.html>.

* cited by examiner

COLLECTING / REMOVING BYPRODUCTS OF LASER ABLATION

BACKGROUND

1. Technical Field

This disclosure relates generally to laser machining and, more particularly, to controlling and removing byproducts of laser ablation to ensure a consistent ablating process and to maintain proper industrial hygiene.

2. Background Information

An aircraft propulsion system may include components that are constructed from structural acoustic panels. As is known to those skilled in this art, a typical acoustic panel includes a face sheet and a back sheet and at least one layer of core, such as a honeycomb core, in between the face sheet and back sheet. The face sheet is perforated. The core, the face sheet, and back sheet together define many small acoustic chambers that are open to the air outside of the face sheet via the perforations. The chambers act to damp acoustic noise by generating an out of phase sound wave that destructively interferes with sound waves hitting the panel.

In modern aircraft, an acoustic panel is frequently constructed from a face sheet and a back sheet made of a composite system such as carbon fiber reinforced epoxy, and from a honeycomb core made from aluminum But, of course, a variety of other materials are possible and may be selected in order to suit a particular application.

One challenge in the construction of acoustic panels is the perforation of the many small holes in the face sheet. Often the holes are on the order of 0.050 inches in diameter down to much smaller diameters, and 10-30% of the face sheet area is removed by the perforation. This means that in some components millions of holes must be formed, and this must be done in an economical and consistent, reliable fashion.

Perforation using a laser beam has been proposed, and is a very attractive option. However, a method and means are needed in order to collect the byproducts of the laser ablation process, especially when conducted on composite materials like carbon fiber reinforced epoxy. The laser beam may be sensitive to being refracted by the small byproduct particles generated during ablation. These particles need to be removed from between the laser's lens and the work piece to ensure a consistent ablation process. Also, the byproducts need to be properly removed to maintain appropriate industrial hygiene.

SUMMARY OF THE DISCLOSURE

According to an aspect of the invention, a method is provided for operating a laser system. During this method, inert gas is directed against an object within a cavity of a collection device. An aperture is formed in the object by ablating the object with a laser beam that travels within the cavity and to the object. Byproducts of the ablation are removed from the cavity.

According to another aspect of the invention, another method is provided for operating a laser system. During this method, inert gas is pooled against an object. A gas curtain is provided proximate a lens. The object is cut using a laser beam which travels from the lens, through the gas curtain and the pooled inert gas, to the object. Fumes and/or particulates produced by the formation are directed away from the laser beam.

The pooling may include directing the inert gas into a cavity of a collection device through a first inlet. The providing may include directing the gas into the cavity through a second inlet. The directing may include removing the fumes and/or the particulates from the cavity through an outlet arranged longitudinally between the first and the second inlets.

The object may be a fiber-reinforced composite and/or is configured as at least a portion of an acoustic panel for a turbine engine.

The method may also include a step of directing gas into the cavity proximate a lens. The laser beam may travel from the lens, within the cavity, to the object.

The directing of the gas may include pooling the gas against the lens within the cavity to substantially prevent the byproducts from contacting the lens.

The gas may be directed into the cavity at an acute angle relative to a surface which defines the cavity.

The byproducts may be removed from the cavity through an outlet. The inert gas may be directed into the cavity through a first inlet positioned between the object and the outlet. The gas may be directed into the cavity through a second inlet positioned between the lens and the outlet.

The inert gas may be directed into the cavity at an acute angle relative to a surface which defines the cavity.

The byproducts may be removed generally tangentially from the cavity.

The method may also include a step of carrying the byproducts within the cavity in a vortical flow.

The byproducts may be removed from the cavity through an outlet. The inert gas may be directed into the cavity through an inlet positioned between the object and the outlet.

The byproducts may be removed from the cavity using a vacuum.

The directing of the inert gas may include pooling the inert gas against the object within the cavity.

The object may be a fiber-reinforced composite and/or is configured as at least a portion of an acoustic panel for a turbine engine.

The foregoing features and the operation of the invention will become more apparent in light of the following description and the accompanying drawings.

DETAILED DESCRIPTION

Figure 1:
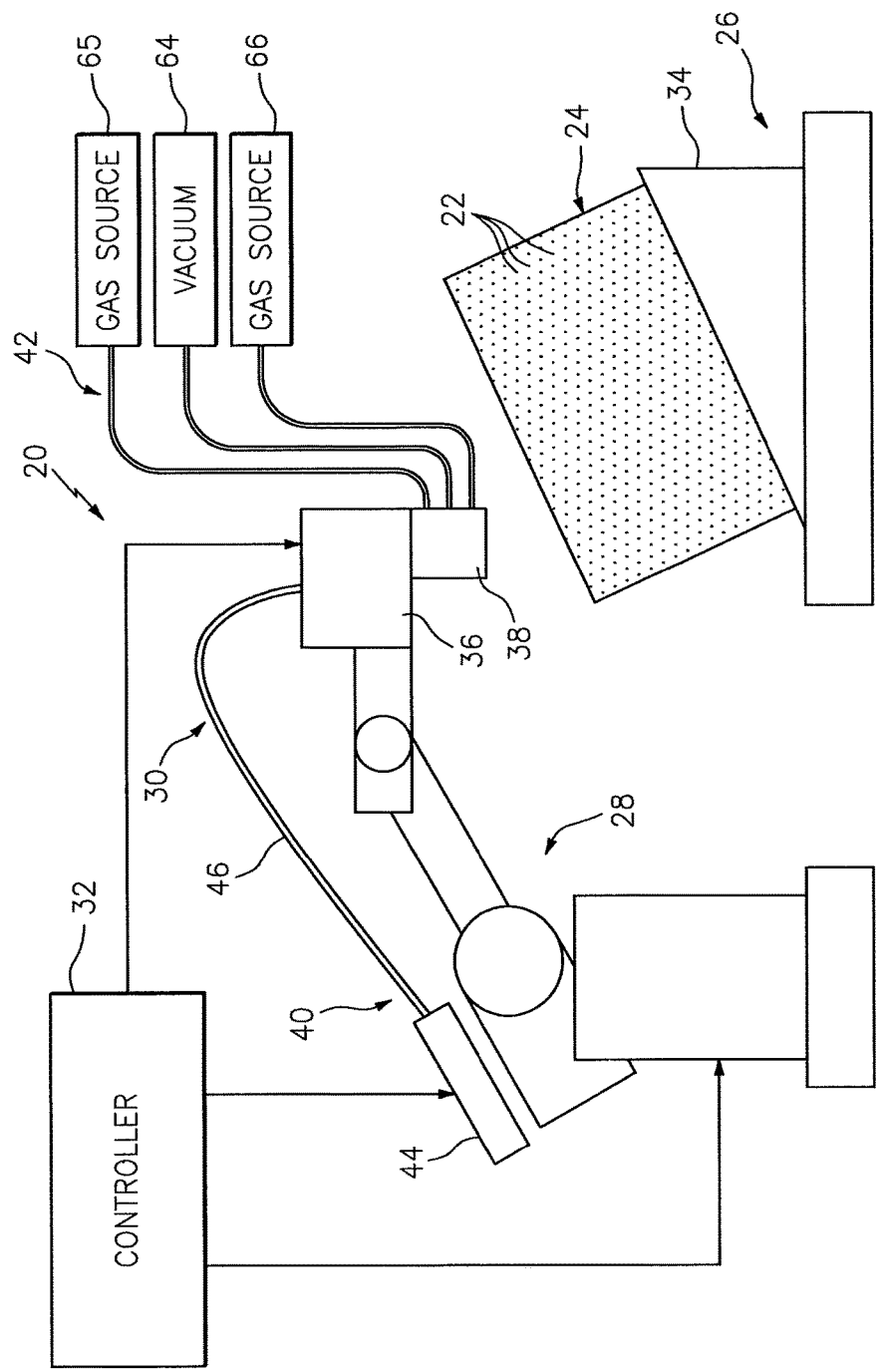
FIG. 1 is a block diagram of a system for forming apertures in an object.

FIG. 1 is a block diagram of a manufacturing system 20 for forming one or more apertures 22 such as through-holes in an object 24, which may be configured as or include a fiber-reinforced composite layer (e.g., sheet) of an acoustic panel. The system 20 includes a base 26, a manipulator 28 and a laser system 30. The system 20 also includes a controller 32 in signal communication (e.g., hardwired and/or wirelessly coupled) with one or more of the system components 28 and 30.

The base 26 is adapted to support the object 24. The base 26 may include a jig 34 to which the object 24 may be attached. The object 24, for example, may be mechanically fastened to the jig 34. The object 24 may also or alternatively be bonded to the jig 34. The jig 34 may be adapted to orientate the object 24 at an angle relative to a gravitational horizon as illustrated in FIG. 1. Of course, various other types and configurations of bases are known in the art, and the system 20 is not limited to including any particular ones thereof nor object 24 orientations.

The manipulator 28, which may be a multi-axis manipulator, is adapted to move one or more components such as a scanner head 36 and/or a collector 38 of the laser system 30 to various locations around and/or to a side of the object 24. The manipulator 28 may also be adapted to move the one or more components (e.g., 36 and 38) to various locations within the object 24; e.g., within a bore of the object 24. The manipulator 28 of FIG. 1, for example, is configured as a six-axis robotic arm. Of course, various other types and configurations of manipulators are known in the art, and the system 20 is not limited to including any particular ones thereof.

The laser system 30 is adapted to form (e.g., cut) the one or more apertures 22 in the object 24, which apertures 22 may be through-holes. The laser system may also be adapted to form dimples, grooves, channels, recessions, indentations, notches, etc. The laser system 30 of FIG. 2, for example, includes a laser 40 optically coupled with the scanner head 36. The laser system 30 also includes a collection system 42.

The laser 40 may be configured as an infrared (IR) laser and/or pulsed laser. The laser 40 may also or alternatively be configured as a fiber laser. The laser 40 of FIG. 2, for example, is configured as an infrared pulsed fiber laser. This laser 40 includes a laser beam source 44 and a length of optical fiber 46, which optically couples the laser beam source 44 with the scanner head 36.

The laser beam source 44 is adapted to generate a laser beam 48. The laser beam source 44 may be configured as or otherwise include, for example, a laser diode; e.g., an infrared laser diode.

The optical fiber 46 is adapted to direct the laser beam 48 generated by the laser beam source 44 to the scanner head 36. The optical fiber 46 may be configured as, for example, a length of flexible, hollow glass fiber capable of transmitting the laser beam 48 through reflectance.

The scanner head 36 is adapted to receive the laser beam 48 from the optical fiber 46 and scan this laser beam 48 over at least a portion of the object 24. The scanner head 36 may also be adapted to change focal lengths of the laser beam 48 during and/or before/after the scanning. The term "scan" may describe a process of directing a laser beam 48 along a path over an object 24 and/or to one or more discrete points on the object 24. The term "focal length" may describe a distance between the scanner head 36 and a focal point 50 of the laser beam 48, which point 50 is where the laser beam 48 converges to its smallest diameter and greatest energy density, and which may be adjusted or set to be where the laser beam 48 is incident with an object 24.

Figure 3:
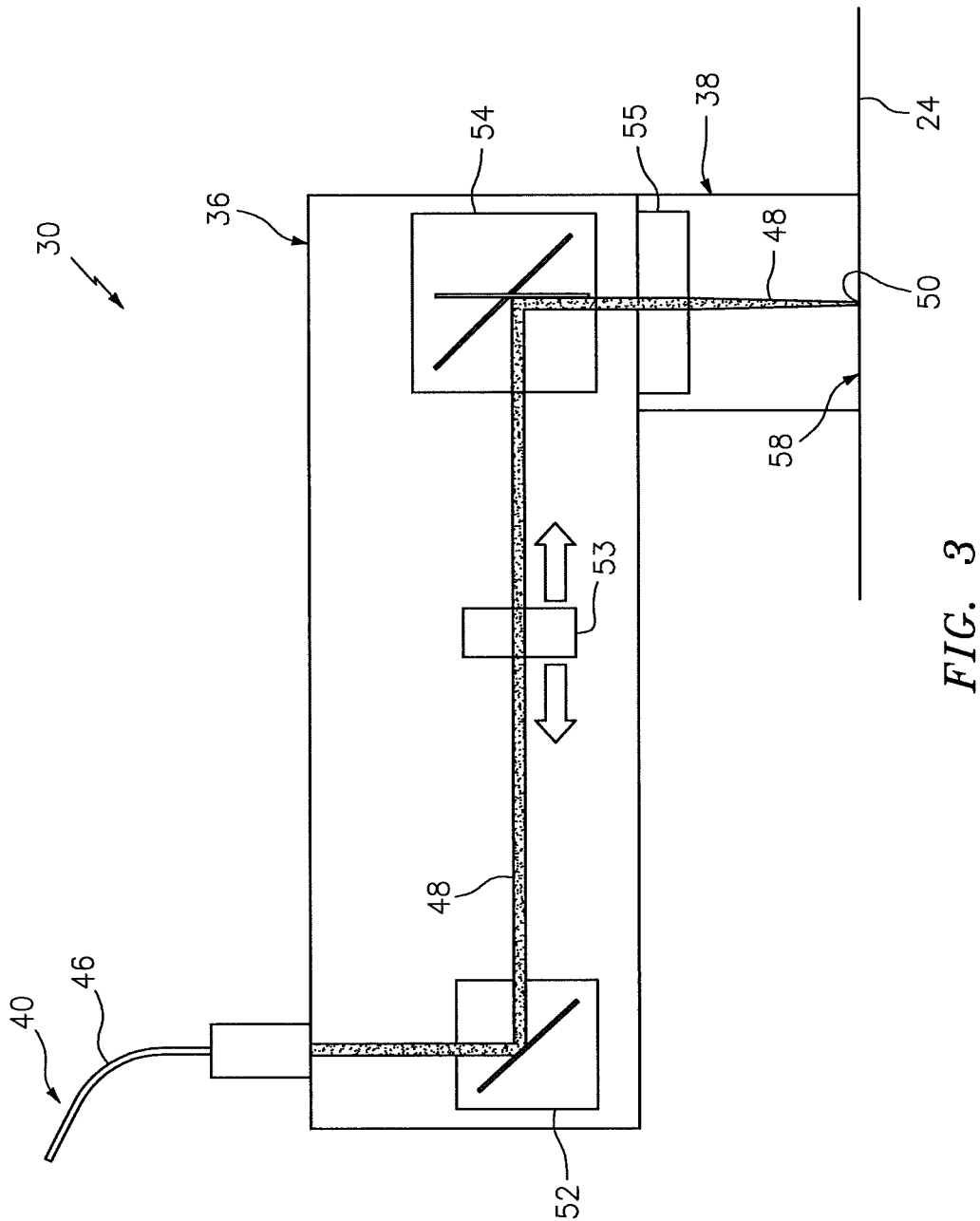
FIG. 3 is a block diagram of a scanner head for the laser system.
Figure 4:
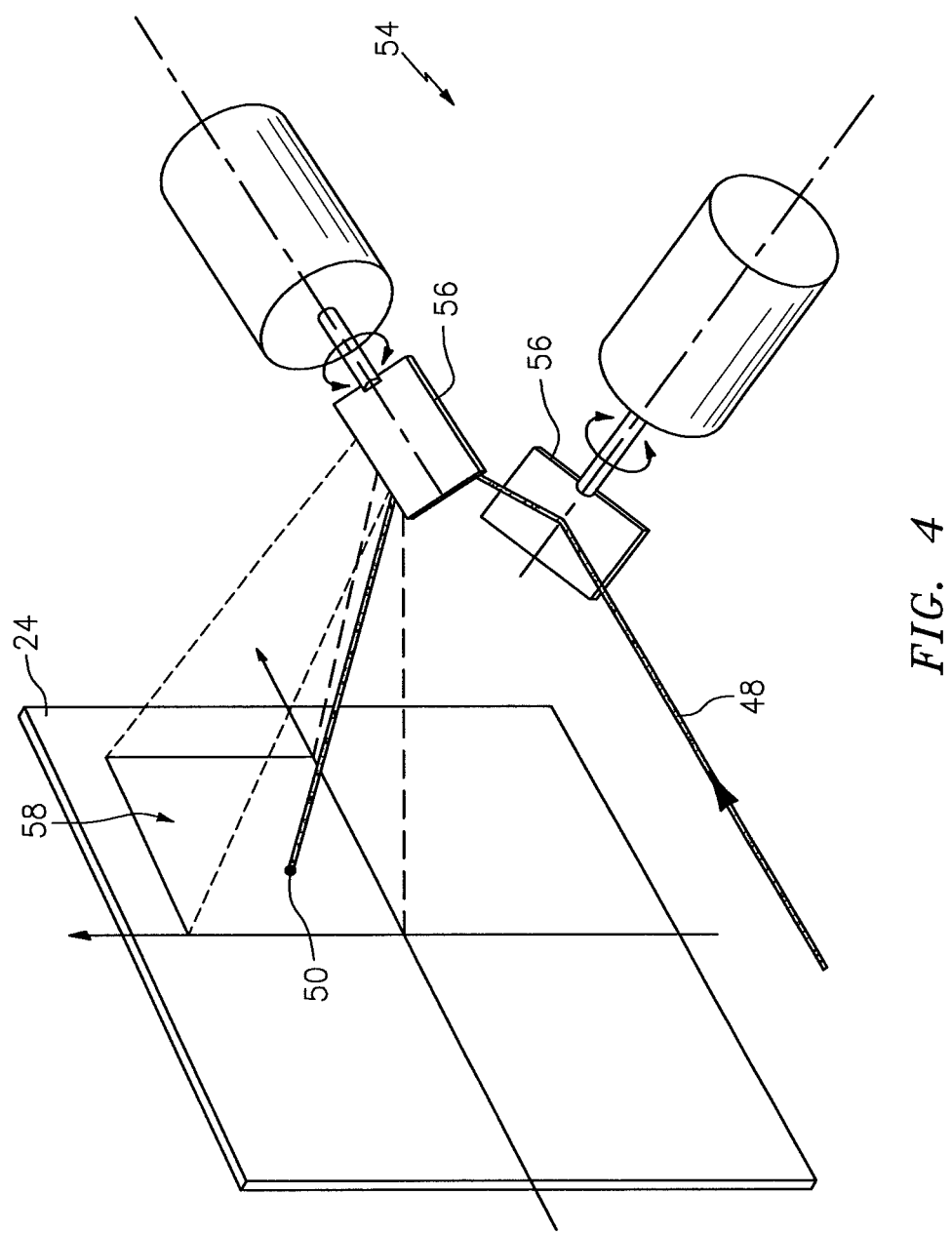
FIG. 4 is a block diagram of an optical element with galvo mirrors for the scanner head.

The scanner head 36 of FIG. 3 includes a plurality of optical elements 52-55. Each of these optical elements 52-55 may be adapted to filter, focus and/or redirect the laser beam 48. The first element 52, for example, may be configured as a bending mirror. The first element 52 is adapted to direct the laser beam 48 received from the optical fiber 46 through the second element 53 and to the third element 54. The second element 53 may be configured as a lens, which translates back and forth between the optical elements. The second element 53 is adapted to change a focal length of the laser beam 48. Referring to FIG. 4, the third element 54 may include one or more (e.g., single-axis) galvo mirrors 56. The third element 54 is adapted to direct the laser beam 48 through the fourth element 55 (see FIG. 3) to various points on the object 24 within a scan area 58. The term "scan area" may describe an area on the object 24 where the laser beam 46 may be directed without moving the scanner head 36. Referring again to FIG. 3, the fourth element 55 may be configured as a stationary focusing lens. The fourth element 55 is adapted to focus the laser beam 48 to the focal point 50. The interior of the scanner head 36 is generally sealed from the outside environment in a manner that no byproducts (e.g., particles, fumes, etc.) of the laser ablation process enter therein. Thus, the optical components 52-55 are protected from being fouled by the byproducts. The only portion of the laser beam that is exposed to the byproducts of ablation is the portion of the beam between the scanner head 36 or focusing lens 55 and the object 24.

Figure 2:
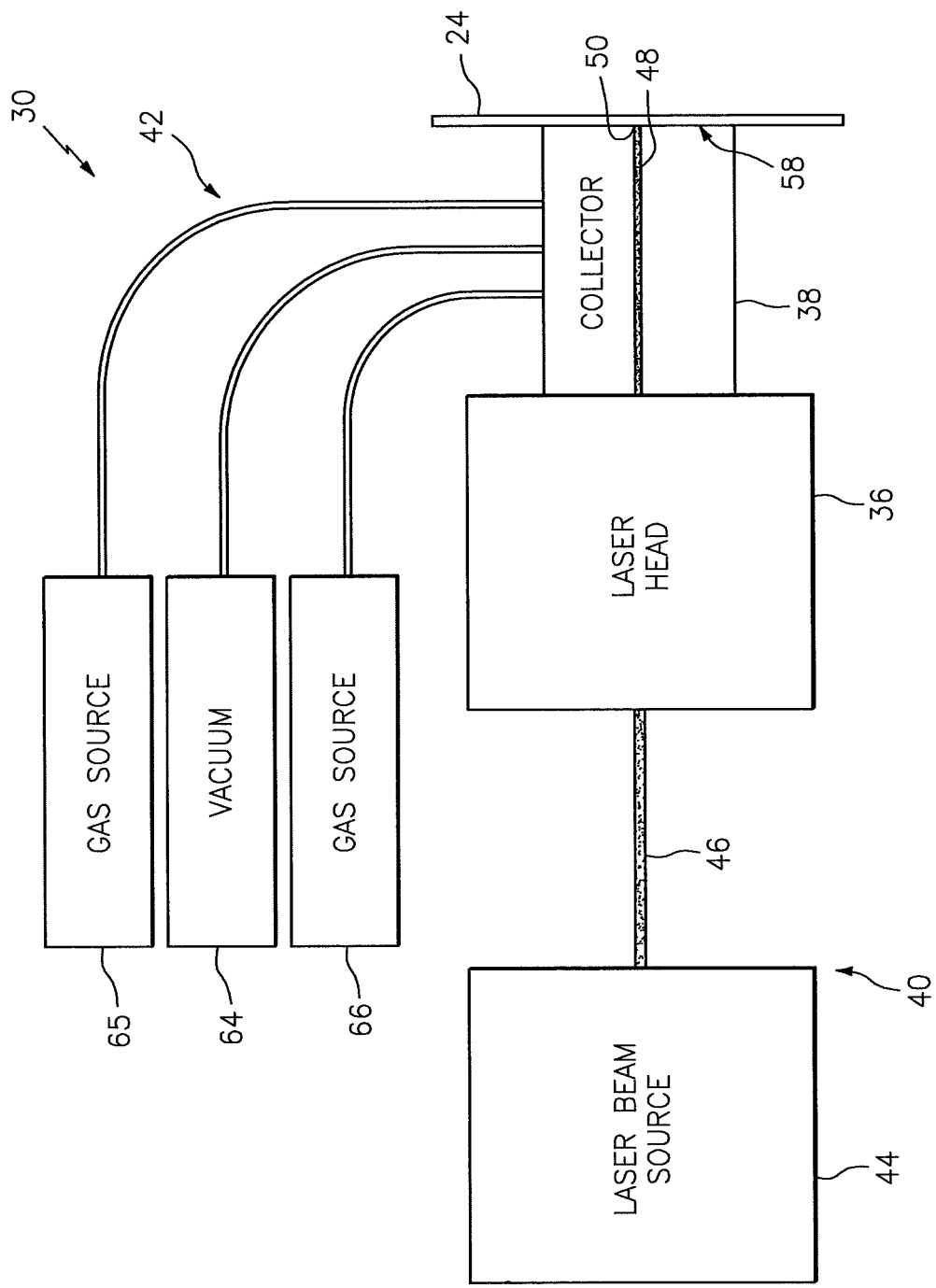
FIG. 2 is a block diagram of a laser system for forming the apertures.
Figure 9:
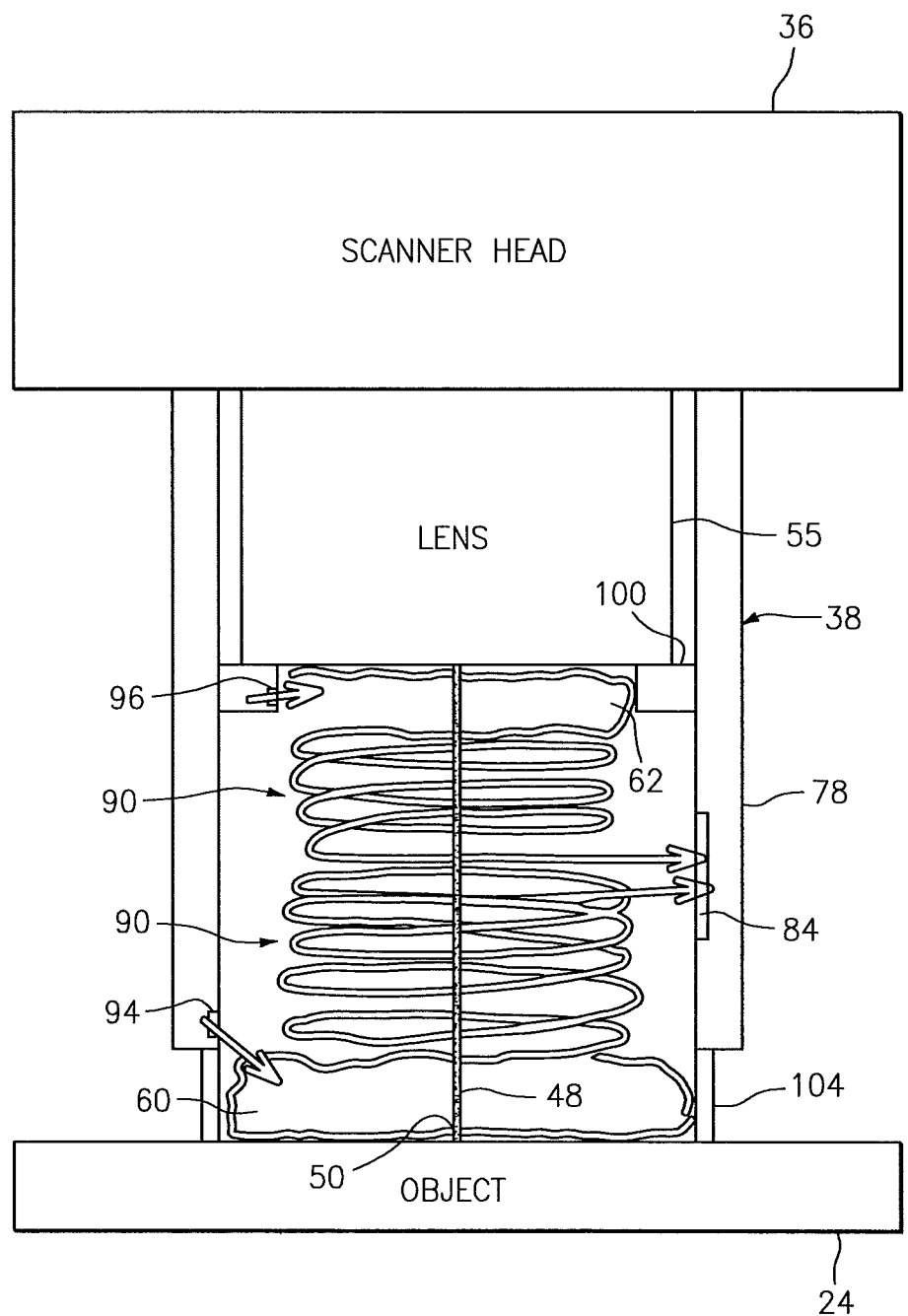
FIG. 9 is a schematic illustration of operation of the collector.

Referring to FIG. 2, the collection system 42 is adapted to provide a controlled environment between the scanner head 36 and the object 24 and, more particularly, between the lens 55 and the scan area 58. The collection system 42, for example, may collect byproducts of laser ablation such as, but not limited to, fumes and/or particulates produced by the laser ablation. The collection system 42 may pool inert gas (e.g., nitrogen gas) against the scan area 58 so as to reduce or eliminate oxygen at the scan area 58 and thereby reduce or eliminate object 24 charring; e.g., see pooled gas 60 in FIG. 9. The collection system 42 may provide a gas curtain proximate the lens 55 so as to reduce the likelihood or substantially prevent the byproducts from contacting the lens 55; e.g., see gas curtain 62 in FIG. 9.

The collection system 42 includes the collector 38. The collection system 42 also includes a vacuum 64, an inert gas source 65 and another gas source 66. Each of the collection system components 64-66 is fluidly coupled with the collector 38 as described below in further detail. The inert gas source 65 may be a reservoir (e.g., a tank or canister) which contains inert gas such as, but not limited to, nitrogen gas. The other gas source 66 may be a reservoir (e.g., a tank or canister) which contains gas such as, but not limited to, air or inert gas. Where the other gas is also inert gas, the sources 65 and 66 may be combined into a single gas source but such combination is not required. Where the other gas is air, the gas source 66 may alternatively be an air compressor.

Depending upon system requirements and/or object 24 materials, one or more gas treatment devices may be coupled inline between the source 65 and the collector 38 and/or between the source 66 and the collector 38. Examples of a gas treatment device include, but are not limited to, a filter and an ionizer. Briefly, such an ionizer is operable to ionize the gas (e.g., inert gas and/or air) directed into the first cavity 72.

Figure 5:
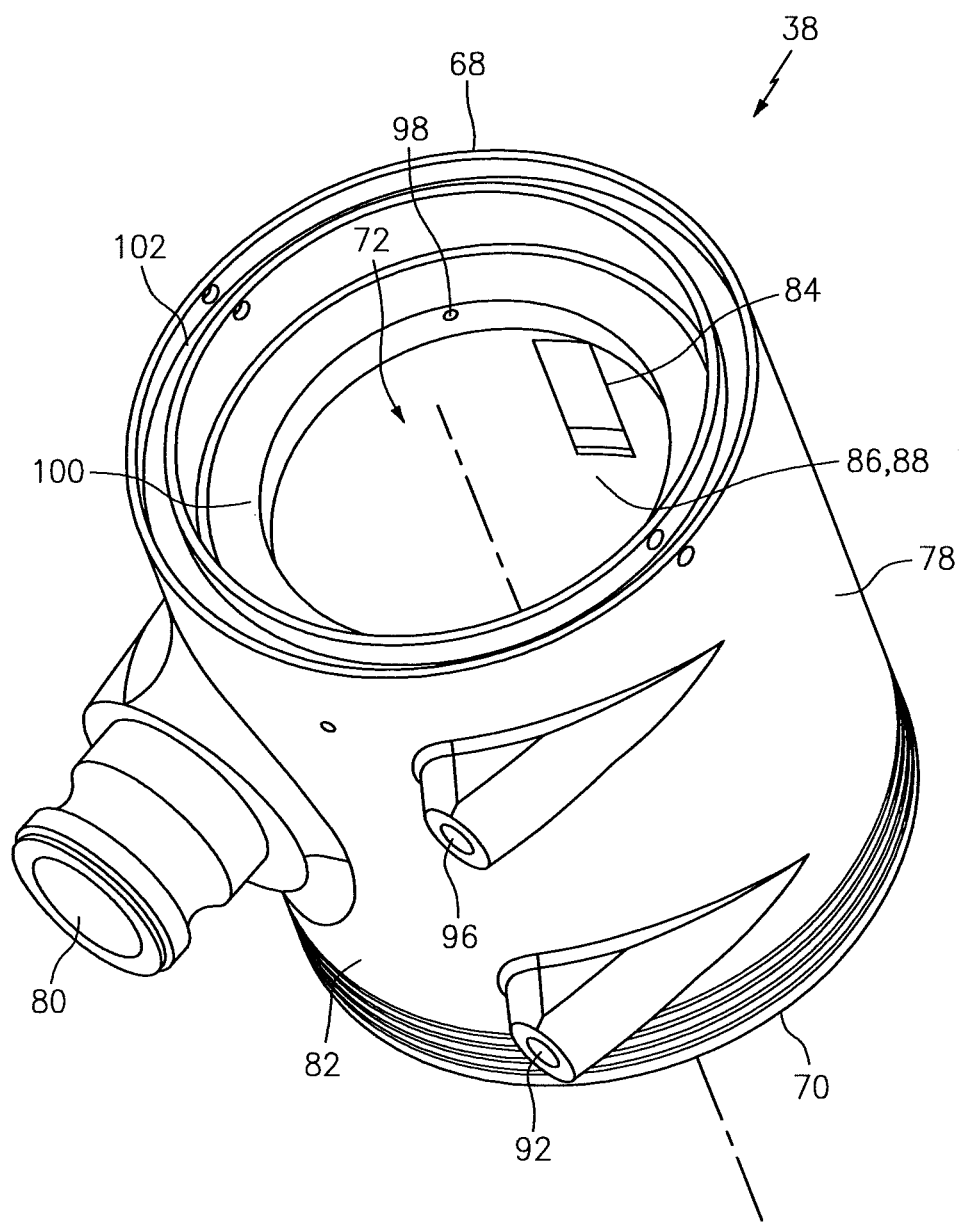
FIG. 5 is a perspective illustration of a collector for a collection system.
Figure 6:
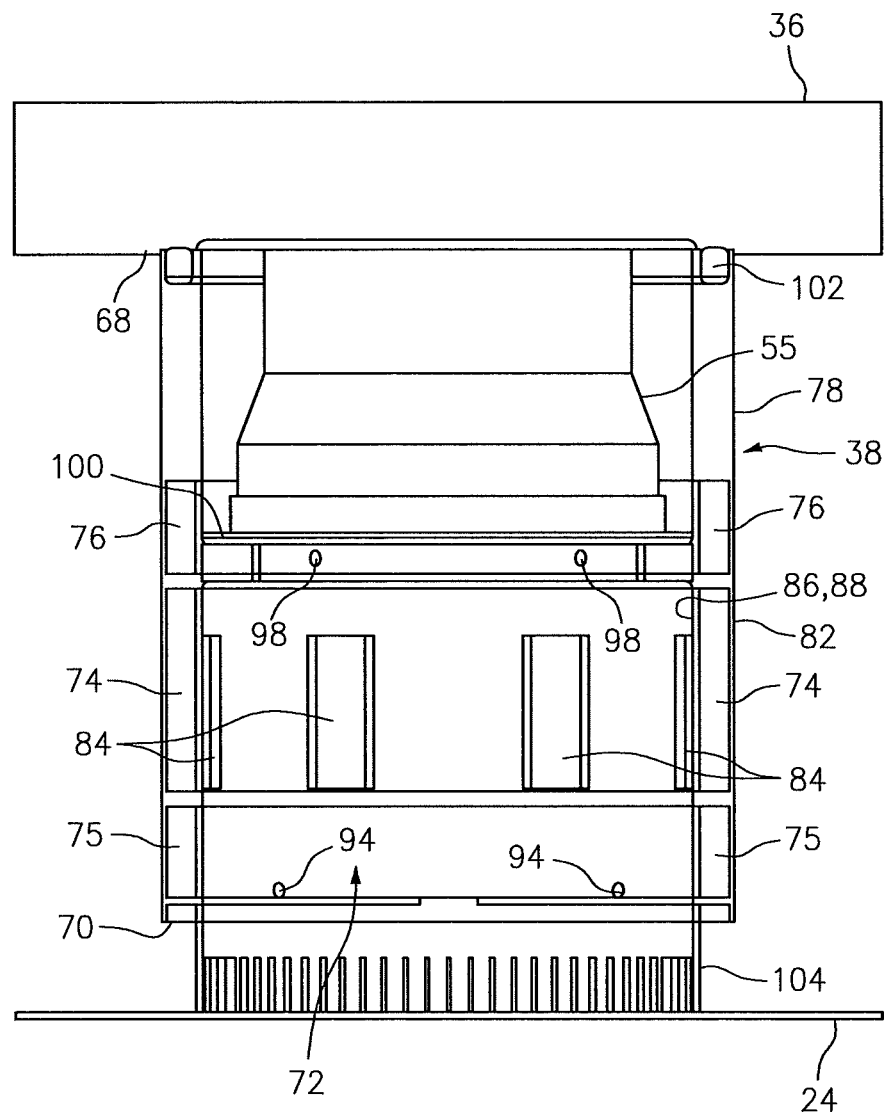
FIG. 6 is a side cutaway illustration of the collector mated with the scanner head.

Referring to FIGS. 5 and 6, the collector 38 may be configured as a generally tubular/hollow structure which extends longitudinally along a centerline between a first end 68 and a second end 70. The collector 38 has a first cavity 72 (e.g., a bore or a central chamber), which extends longitudinally through the collector 38 from the first end 68 to the second end 70. The collector 38 may also have one or more additional cavities 74-76; e.g., substantially annular chambers or manifolds.

The second cavity 74 may be a vacuum chamber, which is embedded within a sidewall 78 of the collector 38 and generally annular in shape. The second cavity 74 is fluidly coupled with the vacuum 64 (see FIGS. 1 and 2) through an outlet 80 in an outer portion 82 of the sidewall 78. The second cavity 74 is fluidly coupled with the first cavity 72 through one or more outlets 84 in an inner portion 86 of the sidewall 78. One or more of these outlets 84 may each extend along a trajectory that is generally tangential to an inner surface 88 of the collector 38, which surface 88 at least partially defines the first cavity 72. One or more of the outlets 84, for example, may each extend along a trajectory that is within about fifteen degrees of being tangent to the inner surface 88; however, the present disclosure is not limited to the foregoing exemplary values. With this configuration, fluid flow into the outlets 84 may have a vector which contributes to the formation of a vortical (e.g., cyclonic) fluid flow 90 within the first cavity 72 as shown in FIG. 7; see also FIG. 9.

Figure 7:
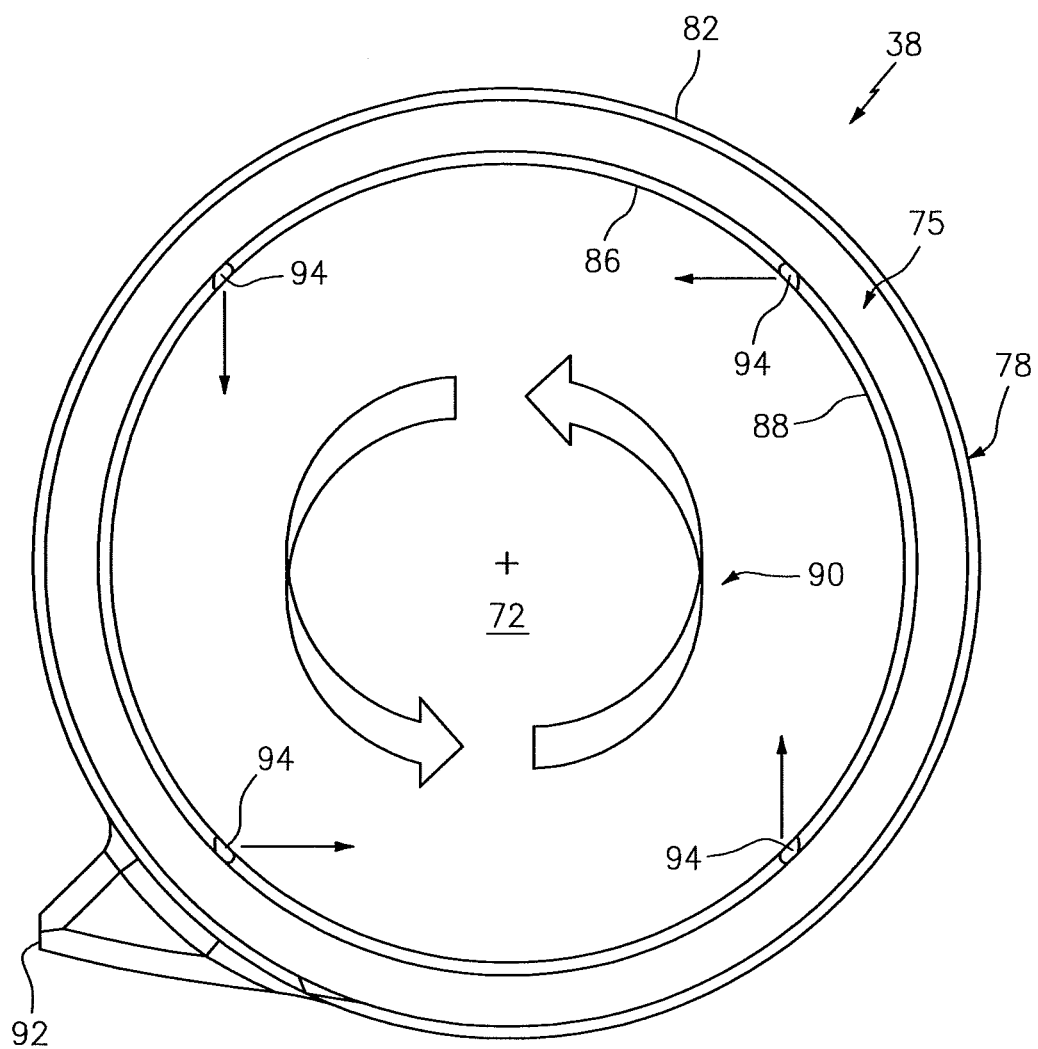
FIG. 7 is a cross-sectional illustration of the collector.

Still referring to FIG. 7, the third cavity 75 may be an inert gas chamber, which is embedded within the sidewall 78 of the collector 38 and generally annular in shape. The third cavity 75 is fluidly coupled with the inert gas source 65 (see FIGS. 1 and 2) through an inlet 92 in the outer portion 82 of the sidewall 78. The third cavity 75 is fluidly coupled with the first cavity 72 through one or more inlets 94 in the inner portion 86 of the sidewall 78. One or more of these inlets 94 may each extend along a trajectory that is acutely angled relative to the inner surface 88. One or more of the inlets 94, for example, may extend along a trajectory that is about sixty degrees from tangent with the inner surface 88 and/or pointed down towards the scan area 58 at approximately thirty-five degrees; however, the present disclosure is not limited to the foregoing exemplary values. With this configuration, inert gas flow out of the inlets 94 and into the first cavity 72 may have a vector which contributes to the formation of the vortical fluid flow 90 within the first cavity 72. The trajectories of one or more of the inlets 94 may also extend longitudinally towards the second end 70 as shown in FIG. 6. One or more of the inlets 94 may also be located at (e.g., in, adjacent or proximate) the second end 70 and longitudinally between the second end 70 and the outlets 84.

Still referring to FIG. 6, the fourth cavity 76 may be another gas chamber, which is embedded within the sidewall 78 of the collector 38 and generally annular in shape. The fourth cavity 76 is fluidly coupled with the other gas source 66 (see FIGS. 1 and 2) through an inlet 96 in the outer portion 82 of the sidewall 78. The fourth cavity 76 is fluidly coupled with the first cavity 72 through one or more inlets 98 in the inner portion 86 of the sidewall 78. One or more of these inlets 98 may each extend along a trajectory that is acutely angled relative to the inner surface 88. One or more of the inlets 98, for example, may extend along a trajectory that is about eighty-five degrees from tangent with the inner surface 88 and/or pointed up towards the lens 55 at approximately fifteen degrees; however, the present disclosure is not limited to the foregoing exemplary values. With this configuration, gas flow out of the inlets 98 and into the first cavity 72 may have a vector which contributes to the formation of the vortical fluid flow 90 within the first cavity 72. The trajectories of one or more of the inlets 98 may also extend longitudinally towards the first end 68. One or more of the inlets 98 may also be located at a shelf 100, which extends radially into the first cavity 72 from the sidewall 78. This shelf 100 may be configured to locate the inlets 98 further radially inwards within the first cavity 72. The shelf 100 may also serve to longitudinally locate the lens 55 within the first cavity 72 and/or generally obstruct fluid flow longitudinally beyond the lens 55 towards the first end 68. In addition, a seal may be formed or positioned between the shelf 100 and the lens 55.

The collector 38 is mated with the scanner head 36. In particular, the lens 55 is received within the first cavity 72. The collector 38 is attached (e.g., mechanically fastened and/or bonded) to the scanner head 36 at its first end 68. In some embodiments, a seal may be positioned within a channel 102 in the first end 68. Such a seal may facilitate a sealed engagement between the collector 38 and the scanner head 36. Of course, such a seal or sealed engagement may be achieved by other means such as, for example, a tight tolerance connection between the collector 38 and the scanner head 36.

The collector 38 may include a generally tubular skirt 104 attached at its second end 70. The skirt could be flexible, or may configured as or include a brush. This skirt 104 may be operable to longitudinally engage or get into close proximity with the surface of the object 24. In this manner, the first cavity 72 may be substantially isolated from the environment surrounding and exterior of the collector 38 and thereby enable a controlled environment for laser ablation as described below in further detail.

Referring to FIG. 1, the controller 32 (e.g., a processing system) is adapted to signal one or more of the system components to perform at least a portion of the method described below. The controller 32 may be implemented with a combination of hardware and software. The hardware may include memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 8:
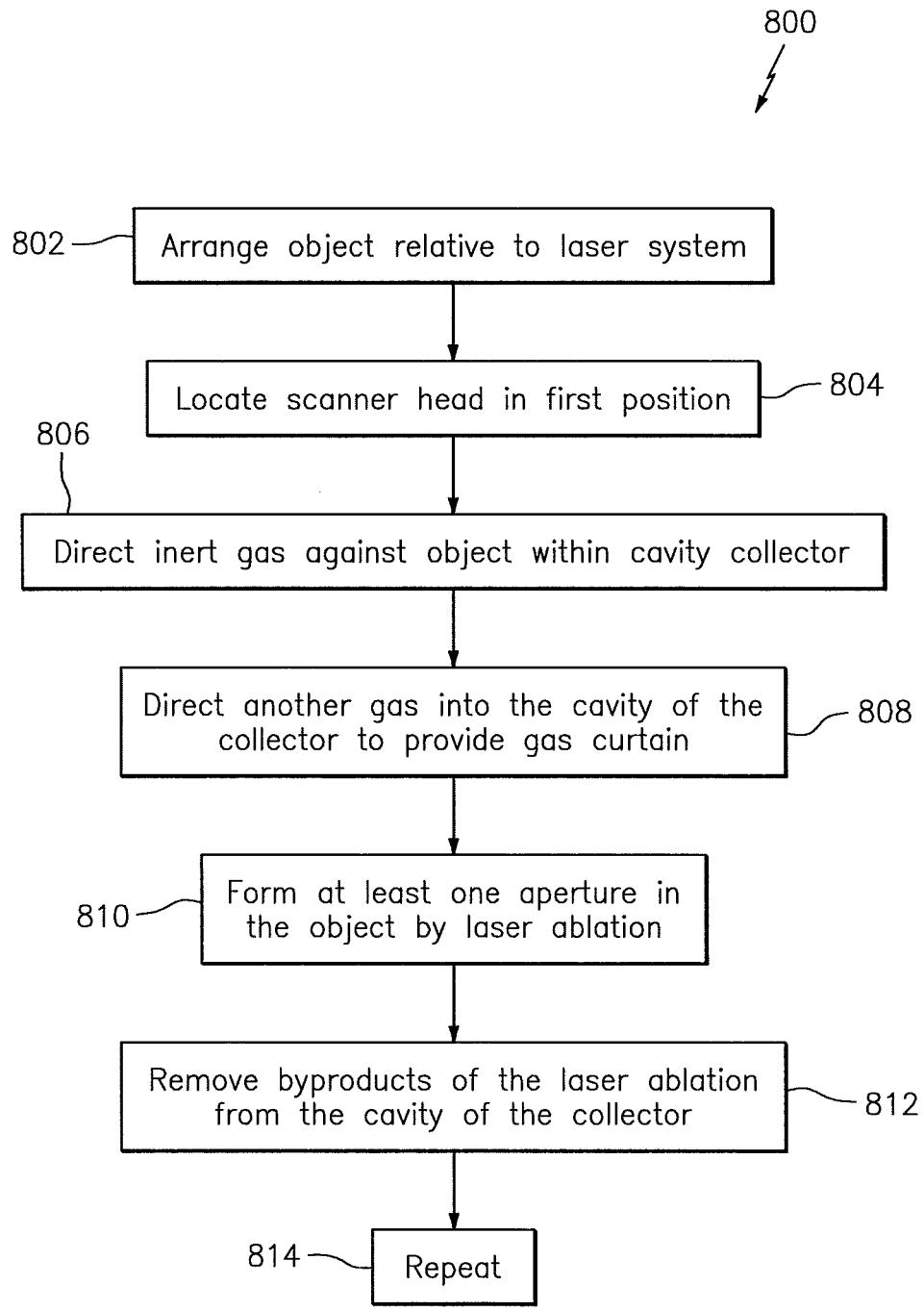
FIG. 8 is a flow diagram of a method for operating a laser system.

FIG. 8 is a flow diagram of a method 800 which for operating a laser system such as the laser system 30 described above. During this method 800, one or more apertures 22 are formed in an object 24. Examples of an aperture include a circular through-hole and a non-circular through-hole. The laser system 30 may also form a dimple, a groove, a channel, a recession, an indentation and a notch or any other shape or cut. The process 800 and the system 20, of course, may also or alternatively form one or more apertures 22 other than the exemplary ones described above. Furthermore, the laser system 30 may also or alternatively be used for cutting the object; e.g., trimming a side of the object. However, the apertures 22 are referred to below as holes for ease of description.

The object 24 may be constructed from a fiber-reinforced composite and/or any other type of laser ablatable material. Exemplary fiber-reinforced composites may include, but are not limited to, carbon fiber, fiberglass and/or Kevlar® fiber embedded within a thermoplastic or thermoset epoxy matrix. The object 24 may be configured as a component of a turbine engine; e.g., an aircraft propulsion system. For example, the object 24 may be configured as a perforated face sheet (or an intermediate sheet) of an acoustic panel for a turbine engine nacelle. Such an acoustic panel may include at least one porous (e.g., honeycomb) core, and may be included as part of an inner barrel, an inner fixed structure (IFS) of the turbine engine nacelle, a blocker door, or the like. The method 800 and the system, however, may also or alternatively form one or more apertures 22 (e.g., holes) in objects other than those described above or included in a turbine engine.

In step 802, the object 24 is arranged relative to the laser system 30. More particularly, the object 24 is arranged relative to the scanner head 36; e.g., next to the scanner head 36, or in any other position where the scanner head 36 may be moved so as to form the holes 22 in the object 24. The object 24, for example, is positioned and secured on the base 26.

In step 804, the scanner head 36 is located in a first position. The controller 32, for example, may signal the manipulator 28 to move the scanner head 36 from a starting position to the first position next to the object 24 and the base 26. In this position, the second end 70 of the collector 38 and, more particularly, the skirt 104 may be positioned in close proximity with or longitudinally engage the object 24 surface.

In step 806, inert gas (e.g., nitrogen gas) is directed against the object 24 within the first cavity 72. The flow of the inert gas into the collector 38 may be selected such that the inert gas pools (e.g., accumulates in a dense cloud 60 that is predominantly inert gas) against the object 24 surface; e.g., see FIG. 9. In this manner, an object buffer region adjacent the object surface may be substantially starved of oxygen so as to prevent object 24 charring during laser ablation. In other words, the pooled inert gas 60 may displace other gases such as, but not limited to, air in the object buffer region.

In step 808, gas (e.g., air) is directed into the first cavity 72 so as to provide a gas curtain 62 proximate the lens 55. For example, the gas may be directed into the first cavity 72 so as to pool against the lens 55 in a lens buffer region; e.g., see FIG. 9. The pooled gas 62 may substantially prevent other gases and/or particulates within the first cavity 72 from traveling into or through the lens buffer region and thereby contacting the lens 55, where the lens buffer region is the region within the first cavity 72 adjacent the lens 55 and the shelf 100.

In step 810, the laser system 30 forms at least one of the apertures 22 in the object 24. The controller 32, for example, signals the laser beam source 44 to generate the laser beam 48. This laser beam 48 is directed from the laser beam source 44 to the scanner head 36 through the optical fiber 46. The scanner head 36 directs the laser beam 48 onto the object 24 surface at a target location (e.g., 50) within the scan area 58. The laser beam 48 subsequently ablates a portion of the object 24 material and thereby forms the hole 22. The scanner head 36 may also or alternatively be operated so as to scan the laser beam 48 in order to form one or more additional holes in the object 24 within the scan area 58 without moving the scanner head 36 to another position.

The laser ablation of the step 810 may form byproducts such as fumes and/or particulates. These byproducts, if allowed to accumulate proximate the scan area 58 and/or proximate the laser beam 48, may distort and/or reduce intensity of the laser beam 48 and/or otherwise hinder accurate, precise and/or efficient laser ablation. Furthermore, the byproduct may necessitate collection to maintain appropriate industrial hygiene. Therefore, to collect, remove and facilitate proper disposal of the byproducts, a vacuum 64 is applied to the outlet 80 in step 812. This vacuum 64 may enable byproducts to be drawn away from the object 24 surface and carried in the vortical flow 90 to the outlets 84, through which the byproducts may be removed from the first cavity 72. It is worth noting, the vortical flow may serve to keep the byproducts generally suspended in the collection region between the buffer regions, and may also draw the particles to the radial sides of such regions so as to minimize interference with the laser beam in the center, before being drawn out of the first cavity 72 through the outlets 84. However, the vacuum 64 may be operable to quickly remove the byproducts from the first cavity 72 so as to prevent any noticeable accumulation of the byproducts within the collector 38.

In step 814, one or more of the steps 804, 806, 808, 810 and 812 may be repeated and/or continued so as to form one or more additional holes in the object 24 at various other locations on the object 24.

In some embodiments, one or more of the inlets 94, 98 and/or outlets 80 may extend along an alternate trajectory than that described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A method for operating a laser system, comprising:
   directing inert gas against an object within a cavity of a collection device;
   directing second gas into the cavity directly next to a lens disposed within the cavity;
   forming an aperture in the object by ablating the object with a laser beam that travels within the cavity and to the object; and
   removing byproducts of the ablation from the cavity;
   wherein the laser beam travels from the lens, within the cavity, to the object.

2. The method of claim 1, wherein the removing the byproducts of the ablation from the cavity comprises:
   carrying the byproducts of the ablation within the cavity away in a vortical flow;
   wherein a top portion of the vortical flow flows downward away from the lens; and
   wherein a bottom portion of the vortical flow flows upward away from the object.

3. The method of claim 1, wherein the directing of the inert gas comprises pooling the inert as against the lens within the cavity to substantially prevent the byproducts from contacting the lens.

4. The method of claim 1, wherein the inert gas is directed into the cavity at an acute angle relative to a surface which defines the cavity.

5. The method of claim 1, wherein
   the byproducts are removed from the cavity through an outlet;
   the inert gas is directed into the cavity through a first inlet positioned between the object and the outlet; and
   the inert gas is directed into the cavity through a second inlet positioned between the lens and the outlet.

6. The method of claim 1, wherein the inert gas is directed into the cavity at an acute angle relative to a surface which defines the cavity.

7. The method of claim 1, wherein the byproducts are removed generally tangentially from the cavity.

8. The method of claim 1, further comprising carrying the byproducts within the cavity in a vortical flow.

9. The method of claim 1, wherein
the byproducts are removed from the cavity through an outlet; and
the inert gas is directed into the cavity through an inlet positioned between the object and the outlet.

10. The method of claim 1, wherein the byproducts are removed from the cavity using a vacuum.

11. The method of claim 1, wherein the directing of the inert gas comprises pooling the inert gas against the object within the cavity.

12. The method of claim 1, wherein the object comprises a fiber-reinforced composite and/or is configured as at least a portion of an acoustic panel for a turbine engine.

13. The method of claim 1, wherein the collection device comprises a sidewall and a shelf that projects radially into the cavity from the sidewall, and the shelf is configured with one or more inlets through which the gas is directed into the cavity proximate the lens.

14. The method of claim 13, wherein the shelf longitudinally locates the lens within the cavity.

15. The method of claim 1, wherein the laser beam travels along an axial centerline, and the second gas is directed into the cavity along a trajectory that is pointed axially relative to the axial centerline towards the lens.

16. The method of claim 1, wherein the second gas is directed into the cavity along a trajectory that extends towards the lens and away from the object.

17. A method for operating a laser system, comprising:
pooling inert gas within a cavity against an object;
providing a gas curtain within the cavity directly next to a lens which is disposed within the cavity;
cutting the object using a laser beam which travels from the lens, through the gas curtain and the pooled inert gas, to the object; and
directing fumes and/or particulates produced by the cutting away from the laser beam.

18. The method of claim 17, wherein
the pooling comprises directing the inert gas into the cavity of a collection device through a first inlet;
the providing comprises directing the gas into the cavity through a second inlet; and
the directing comprises removing the fumes and/or the particulates from the cavity through an outlet arranged longitudinally between the first and the second inlets.

19. The method of claim 17, wherein the object comprises a fiber-reinforced composite and/or is configured as at least a portion of an acoustic panel for a turbine engine.

20. A method for operating a laser system, comprising:
directing inert gas against an object within a cavity of a collection device;
directing gas into the cavity proximate a lens;
forming an aperture in the object by ablating the object with a laser beam that travels within the cavity and to the object;
carrying byproducts of the ablation within the cavity away in a vortical flow, wherein a top portion of the vortical flow flows downward away from the lens, and wherein a bottom portion of the vortical flow flows upward away from the object; and
removing the byproducts being carried in the vortical flow from the cavity.

* * * * *